United States Patent
Huang et al.

(10) Patent No.: US 8,243,810 B2
(45) Date of Patent: Aug. 14, 2012

(54) MOTION ESTIMATION APPROACH FOR REAL-TIME EMBEDDED MULTIMEDIA DESIGN

(75) Inventors: Shih-Chia Huang, Taipei (TW); Sy-Yen Kuo, Taipei (TW)

(73) Assignee: Acer Incorporated, Hsichih, Taipei Hsien (TW)

( * ) Notice: Subject to any disclaimer, the term of this patent is extended or adjusted under 35 U.S.C. 154(b) by 280 days.

(21) Appl. No.: 12/564,556

(22) Filed: Sep. 22, 2009

(65) Prior Publication Data
US 2010/0208820 A1 Aug. 19, 2010

(30) Foreign Application Priority Data
Feb. 18, 2009 (TW) .............................. 98105075 A (51) Int. Cl.
*H04N 7/12* (2006.01)
(52) U.S. Cl. ..................... 375/240.16; 375/240.24
(58) Field of Classification Search .................. 375/240, 375/240.01, 240.16, 240.24, 240.12
See application file for complete search history.

(56) References Cited

U.S. PATENT DOCUMENTS

| | | | |
|---|---|---|---|
| 2005/0025244 A1* | 2/2005 | Lee et al. ................. | 375/240.16 |
| 2006/0120613 A1 | 6/2006 | Su et al. | |
| 2006/0245497 A1* | 11/2006 | Tourapis et al. ......... | 375/240.16 |
| 2006/0280248 A1* | 12/2006 | Kim et al. ................ | 375/240.16 |
| 2007/0092006 A1* | 4/2007 | Malayath ................. | 375/240.16 |
| 2007/0217514 A1* | 9/2007 | Kumar et al. ............ | 375/240.16 |
| 2007/0291846 A1* | 12/2007 | Hussain ................... | 375/240.16 |
| 2008/0205526 A1* | 8/2008 | Kang ........................ | 375/240.16 |
| 2009/0168884 A1* | 7/2009 | Lu et al. ................... | 375/240.16 |
| 2009/0190037 A1* | 7/2009 | Chang et al. ................. | 348/699 |
| 2009/0207915 A1* | 8/2009 | Yan et al. ................. | 375/240.16 |
| 2010/0080297 A1* | 4/2010 | Wang et al. ............. | 375/240.16 |

FOREIGN PATENT DOCUMENTS

| | | |
|---|---|---|
| CN | 101227614 A | 7/2008 |
| TW | 200614797 A | 5/2006 |
| TW | 200620994 A | 6/2006 |

OTHER PUBLICATIONS

Li, D.X., et al., "Architecture Design for H.264/AVC Integer Motion Estimation with Minimum Memory Bandwidth," IEEE Transactions on Consumer Electronics, vol. 53, No. 3, Aug. 2007, pp. 1053-1060.

(Continued)

*Primary Examiner* — Kwang B Yao
*Assistant Examiner* — Nguyen Ngo
(74) *Attorney, Agent, or Firm* — Snell & Wilmer, LLP (57) ABSTRACT

A method for performing motion estimation is provided. The method includes the following steps: selecting a current block in a current frame; obtaining motion vectors and residual data of a plurality of neighboring blocks adjacent to the current block; setting a predetermined threshold value according to the residual data of the plurality of neighboring blocks; comparing the current block with an initial reference block in a reference frame to obtain an initial comparison result, and comparing the predetermined threshold value with the initial comparison result; determining a predicted motion vector of the current block according to the motion vectors of the plurality of neighboring blocks if the initial comparison result is larger than the predetermined threshold value; and performing a block-matching operation in a search window corresponding to the predicted motion vector to determine a corresponding reference block which best matches the current block.

15 Claims, 7 Drawing Sheets

OTHER PUBLICATIONS

Tuan, J.C., et al., "On the Data Reuse and Memory Bandwidth Analysis for Full-Search Block-Matching VLSI Architecture," IEEE Transactions on Circuits and Systems for Video Technology, vol. 12, No. 1, Jan. 2002, pp. 61-72.

Chen, T.C., et al., "Single Reference Frame Multiple Current Macroblocks Scheme for Multi-Frame Motion Estimation in H.264/AVC," IEEE Explore, Copyright 2005, Downloaded Nov. 20, 2008, pp. 1790-1793.

Chen, C.Y., et al., "Level C+ Data Reuse Scheme for Motion Estimation with Corresponding Coding Orders," IEEE Transactions on Circuits and Systems for Video Technology, vol. 16, No. 4, Apr. 2006, pp. 553-558.

Office Action mailed May 8, 2012 in counterpart Chinese Application No. 098105075.

* cited by examiner

MOTION ESTIMATION APPROACH FOR REAL-TIME EMBEDDED MULTIMEDIA DESIGN

CROSS-REFERENCE TO RELATED APPLICATIONS

This application claims priority to Taiwan Patent Application No. 098105075 entitled "MOTION ESTIMATION APPROACH FOR REAL-TIME EMBEDDED MULTIMEDIA DESIGN," filed on Feb. 18, 2009, which is incorporated herein by reference.

FIELD OF INVENTION

The present invention relates to a method for performing motion estimation, and more particularly to a method for performing motion estimation which is capable of effectively reducing memory usage and bandwidth requirements.

BACKGROUND OF THE INVENTION

Since multimedia applications are becoming more and more popular, the video compression techniques are also becoming increasingly important. A lot of video compression standards have been developed, such as MPEG-4 and H.264/AVC. The main principle of these standards is to eliminate redundancy among successive frames to reduce the storage requirement and the amount of transmission data. Motion estimation plays an important role in video coding for achieving compression, which can reduce the temporal redundancy based on the similarity among successive frames.

Figure 1:
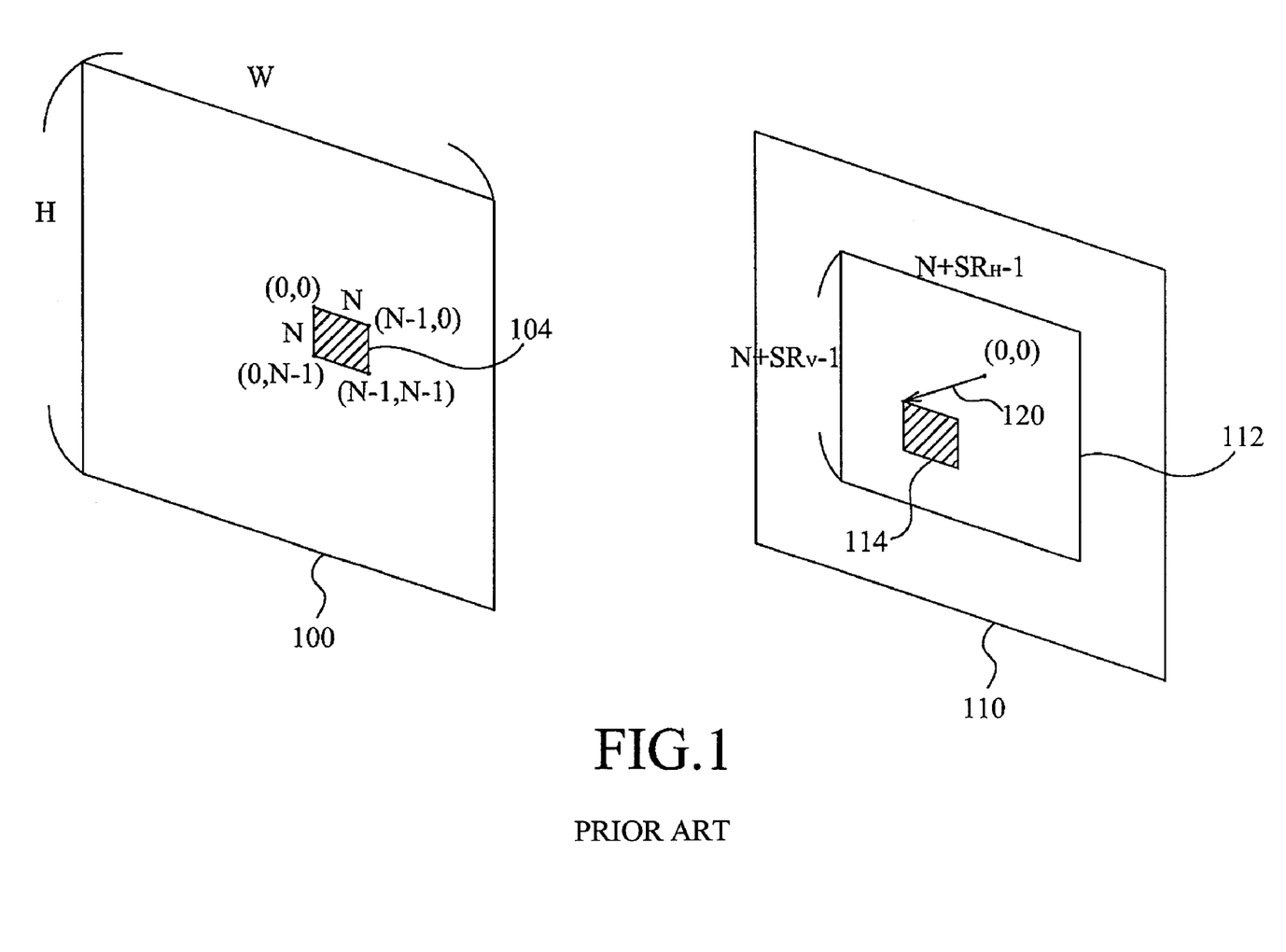
FIG. 1 is a diagram illustrating block-matching motion estimation scheme according to the prior art.

FIG. 1 is a diagram illustrating block-matching motion estimation scheme according to the prior art. At first, a current frame 100 of size W×H pixels is divided into a plurality of current blocks of size N×N pixels. For a current block 104, a search window 112 of size $(N+SR_H-1) \times (N+SR_V-1)$ pixels is established in a reference frame 110 (e.g., the previous frame or the following frame), and after comparing the current block 104 with candidate blocks in the search window 112, a block 114 can be identified as the block in the search window 112 that best matches the current block 104 in the current frame 100. Next, the difference (i.e., residual) between these two blocks 104 and 114 and a motion vector 120 denoting the displacement of the block 104 with respect to the block 114 are calculated. Then, the residual and the motion vector 120 can be used to represent the block 104 so as to remove the redundancy and achieve data compression, which is the so-called motion estimation. In other words, the purpose of the motion estimation is to estimate motion vector and resulting residual of each current block and use this information to represent the entire current frame. However, since a lot of candidate blocks need to be compared, the motion estimation is a compute-intensive operation with high bandwidth requirements.

Figure 2:
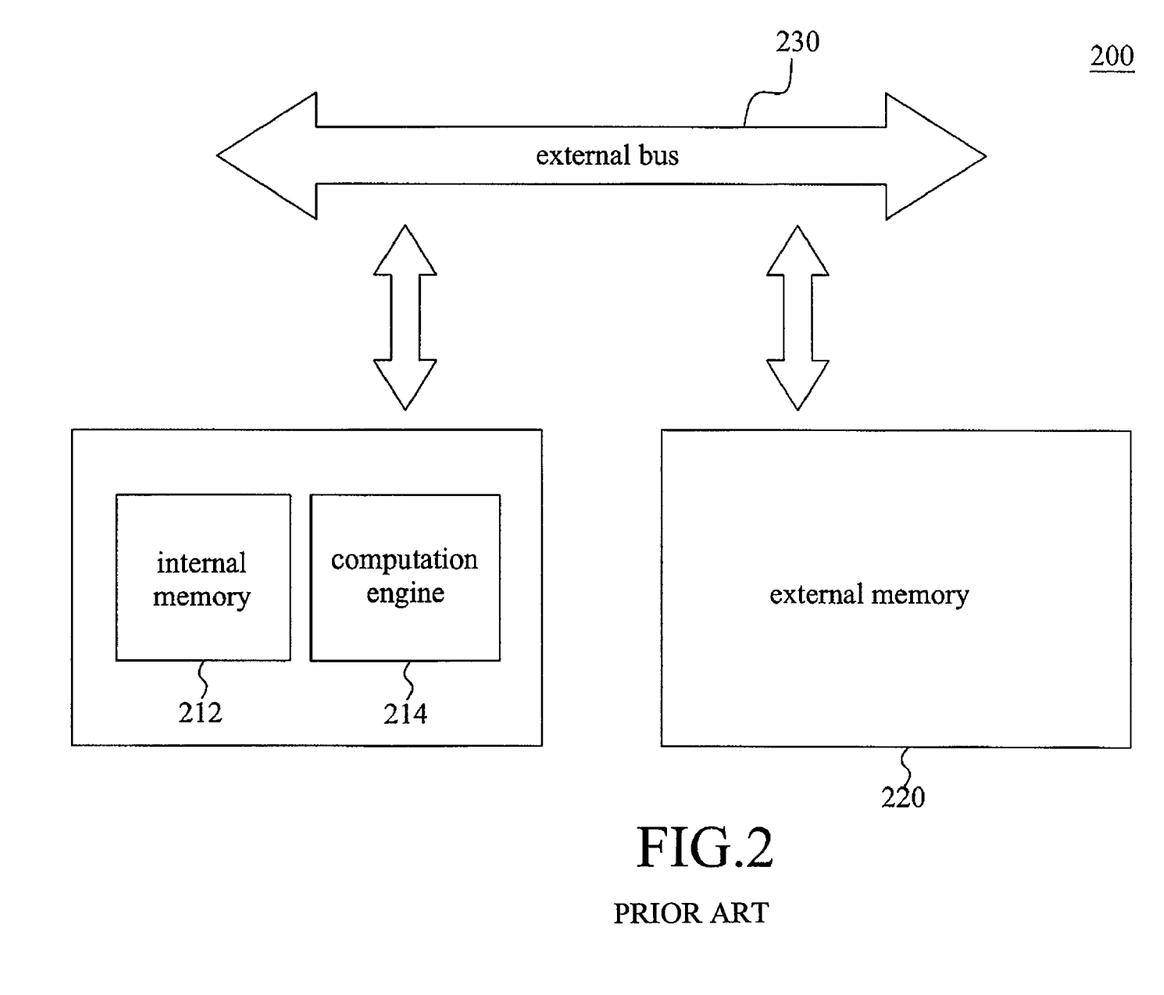
FIG. 2 is a hardware architecture of a video coding system.

FIG. 2 shows a hardware architecture of a video coding system 200. The reference frames and current frames are stored in an external memory 220, and then the data required for the motion estimation are loaded from the external memory 220 into an internal memory 212 via an external bus 230 to be processed by a computation engine (such as an embedded processor) 214. Therefore, during process of performing the motion estimation, the required candidate blocks in a search window of the reference frames are frequently transferred between the external memory 220 and internal memory 212 via the external bus 230 for data matching computation, which causes high usage of memory bandwidth. Typically, the size of the search window 112 may depend on the display resolution and/or specifications of compression standards. The larger the search window 112 is, the larger the amount of data required to be loaded into the internal memory is, and also the memory bandwidth requirement is.

Therefore, it is desired to have a method for performing motion estimation capable of reducing memory bandwidth requirements.

SUMMARY OF THE INVENTION

In light of the problems of the prior art, the present invention provides a low-power and high-performance video coding method for performing motion estimation by using square search algorithm, which is suitable for various existing video compression standards, such as MPEG-4 and H.264/AVC. The method of the present invention can effectively reduce memory usage and bandwidth requirements, such that hardware cost and power consumption can be lowered and the operation speed can be enhanced.

According to one aspect of the present invention, a method for performing motion estimation is provided. The method of the present invention includes the following steps: selecting a current block in a current frame; obtaining motion vectors and residual data of a plurality of neighboring blocks adjacent to the current block; setting a predetermined threshold value according to the residual data of the plurality of neighboring blocks; comparing the current block with an initial reference block in a reference frame to obtain an initial comparison result, and comparing the predetermined threshold value with the initial comparison result; determining a predicted motion vector of the current block according to the motion vectors of the plurality of neighboring blocks if the initial comparison result is larger than the predetermined threshold value; and performing a block-matching operation in a search window corresponding to the predicted motion vector, whereby a best-match reference block in the search window is determined.

According to another aspect of the present invention, a computer readable medium is provided. The computer readable medium has computer-executable instructions stored thereon, and when the computer-executable instructions are executed by a computing device, the computer-executable instructions cause the computing device to implement the above-mentioned method.

Other aspects of the present invention are stated and easily understood through the following description of the embodiments of the present invention. The aspects of the present invention would be appreciated and implemented by the elements and their combinations pointed out in the appended claims. It should be understood that the above summary of the invention and the following detailed description are only illustrative but not to limit the present invention.

BRIEF DESCRIPTION OF THE DRAWINGS

The drawings are employed to illustrate the embodiments and the principles of the present invention in conjunction with the description. However, it should be understood that the present invention is not limited to the shown configurations and elements, in which.

DETAILED DESCRIPTION OF THE PREFERRED EMBODIMENTS

The present invention provides a method for performing motion estimation by utilizing both of square search algorithm and data reuse scheme, which can effectively reduce on-chip memory usage and bandwidth requirements. Instead of loading the whole search window as in conventional motion estimation methods, the present invention can adaptively adjust the range of the search window based on the spatial dependence among neighboring blocks. The objects, features and advantages of the present invention will become more apparent by referring to the following description of the preferred embodiments and FIGS. 3-7. However, the apparatuses, elements, and steps of the method described in the following embodiments are intended to illustrate the present invention, but not to limit the scope of the invention.

Figure 3:
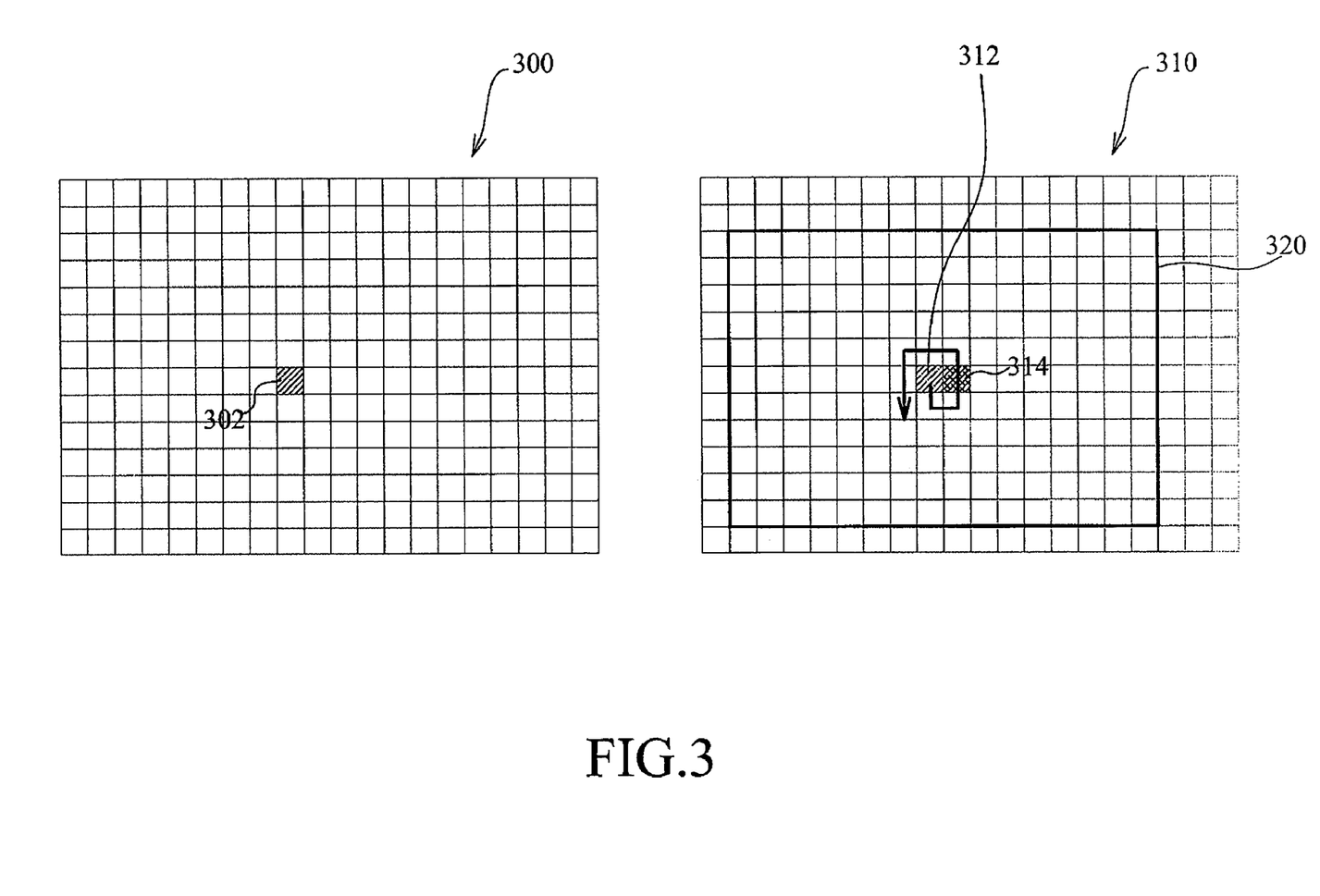
FIG. 3 is a diagram illustrating a method of performing motion estimation by using a square search algorithm according to an embodiment of the present invention.

FIG. 3 is a diagram illustrating a method of performing motion estimation by using a square search algorithm according to an embodiment of the present invention. For a current block 302 of N×N pixels within a current frame 300, a search window 320 in a reference frame 310 is determined. Typically, the center position of the search window 320 corresponds to the position of the current block 302 in the current frame 300, and the search window 320 contains a plurality of candidate blocks to be compared with the current block 302. A block within the search window 320 that most closely matches the current block 302 can be identified by performing block-matching motion estimation. In this embodiment, the block-matching motion estimation is performed based on the sum of absolute difference (SAD) between the current block 302 and each of the candidate blocks in the search window 320, which can be obtained via the following equation:

$$SAD = \sum_{i=0}^{N-1} \sum_{j=0}^{N-1} |(C_{ij} - R_{ij})|$$

where Cij denotes the set of pixels that belong to the current block, Rij denotes the set of pixels that belong to one of the candidate blocks. Each pixel in the current block is compared to and subtracted from each related pixel in candidate block for obtaining N×N difference values, and then absolute values of N×N difference values are summed up to obtain the SAD value. A smaller SAD value indicates that the current block is more similar to the candidate block. It should be noted that the SAD value described above for determining the similarity between the current block 302 and the candidate blocks is used only for illustration, and is not intended to limit the present invention. Other criteria, such as mean square error or mean absolute error, can also be adopted in the present invention.

Figure 4:
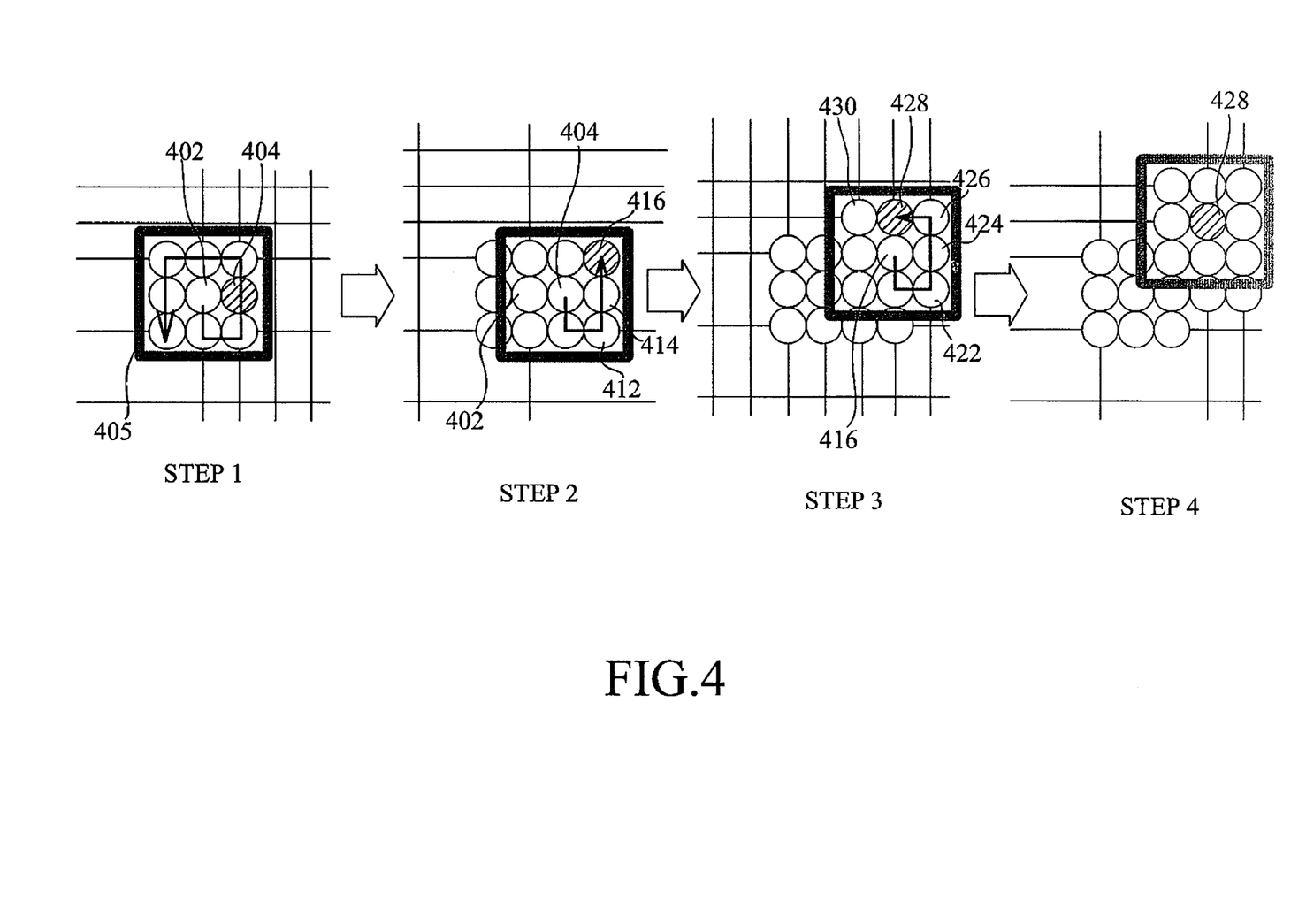
FIG. 4 is a schematic diagram illustrating a motion estimation process performed by using a square search algorithm.

In the embodiment shown in FIG. 3, the motion estimation is performed by using square search algorithm to identify a block in the reference frame 310 that is most similar to the current block 302. The square search algorithm performs the comparison by utilizing square pattern within the search window. FIG. 4 is a schematic diagram illustrating a motion estimation process performed by using square search algorithm. At first, in step 1, the comparison starts from a block 402 in the reference frame corresponding to the position of the current block, and then a best-match block (i.e. a block having a minimum SAD value) within a square pattern 405, consisting of nine blocks centered on the block 402, is determined. In this embodiment, the block 404 is assumed to be the best-match block in step 1. Next, the procedure proceeds to step 2 to find a best-match block within a new square pattern centered on the block 404, wherein the newly added blocks 412, 414, and 416 need to be loaded into an internal memory. It is assumed that the block 416 is the best-match block in step 2. Next, in step 3, a new square pattern centered on the block 416 is adopted and the newly added blocks 422, 424, 426, 428, and 430 are loaded for repeating the above comparison operation. It is assumed that the block 428 is the best-match block in step 3. In step 4, the above comparison operation is repeated within a new square pattern centered on the block 428. If the best-match block in step 4 is located on the center of the square pattern (i.e. the best-match block is the block 428), the square search algorithm for this current block can be terminated.

Back to FIG. 3, in this embodiment, the comparison starts from the block 312 corresponding to the position of the block 302 within a region formed by nine blocks centered on the block 312, for finding a best-match block (i.e. a block having a minimum SAD value). For example, the comparison can be performed for nine blocks sequentially along the path shown by the arrow in FIG. 3. Assuming that the block 314 has a minimum SAD value compared to other blocks, the above comparison operation is repeated within a new region centered on the block 314 until a corresponding best-match block is located on center of the compared region.

Figure 5:
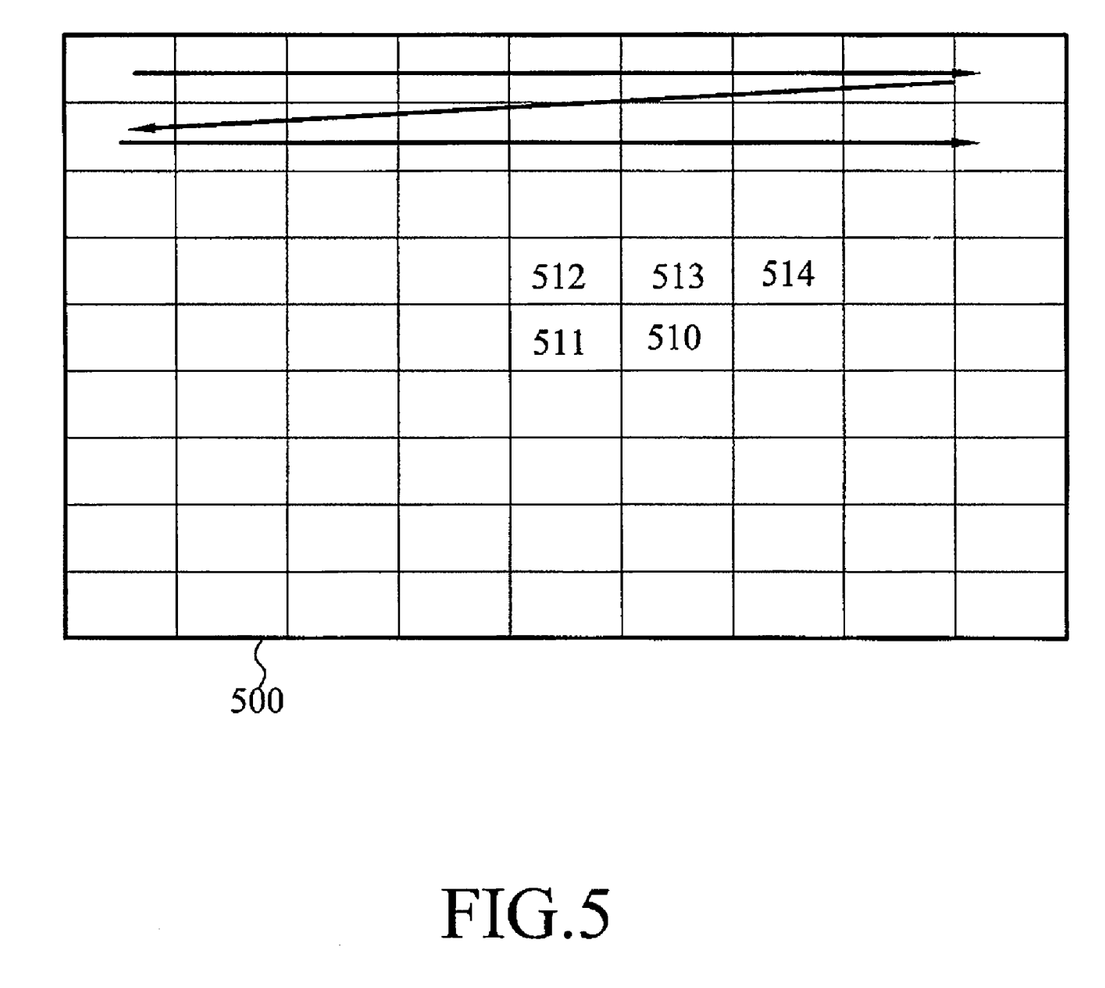
FIG. 5 illustrates an example of scanning in raster order.

The above-described motion estimation process will be performed for each block in the current frame 300 to find a corresponding matching block in the reference frame respectively. The processing order of performing motion estimation determines which blocks neighboring with a particular block have been already estimated. For example, FIG. 5 is a schematic diagram illustrating a motion estimation performed in raster order. The blocks in the frame 500 are scanned from left to right and from top to bottom. Therefore, for a particular block (such as block 510), its left (511), upper-left (512), upper (513), and upper-right (514) neighboring blocks have been processed by the motion estimation method and therefore their motion vectors and search windows are available. Based on the related information of the neighboring blocks and spatial correlation between neighborhood blocks, the search window of the current block can be adaptively adjusted, and a threshold SAD value corresponding to the current block can be determined.

Referring to the embodiment shown in FIG. 3, the predicted search window and the predetermined threshold value corresponding to the current block 302 can be obtained according to the comparison results of the neighboring blocks, which will be described below. At first, the motion vectors and comparison data of the neighboring blocks which have already been processed with motion estimation are obtained. Typically, the comparison data are referred to SAD values with respect to matched reference blocks respectively and will be called residual data hereinafter. The predetermined threshold value of the current block can be set as follow:

$$\alpha_n = (2 \times LEFT_{SAD} + 2 \times TOP_{SAD} + TOP\text{-}RIGHT_{SAD} + TOP\text{-}LEFT_{SAD} + \epsilon)/6$$

where $LEFT_{SAD}$ represents residual data corresponding to a left neighboring block of the current block, $TOP_{SAD}$ represents residual data corresponding to an upper neighboring block of the current block, $TOP\text{-}RIGHT_{SAD}$ represents residual data corresponding to an upper-right neighboring block of the current block, $TOP\text{-}LEFT_{SAD}$ represents residual data corresponding to an upper-left neighboring block of the current block, and $\epsilon$ represents a constant factor corresponding to the current block. $\epsilon$ is a correction factor for compensating possible inaccuracy, which is generally determined based on practical experience and can be adjusted to suit specific applications. In this embodiment, the residual data of neighboring blocks can be weighted according to their distance from the current block. For example, the left neighboring block and the upper neighboring block, which are closer to the current block, can be weighted by 2. However, in other embodiments, each neighboring block can be weighted differently depending on actual applications. It should be noted that the present invention is not limited to any particular scanning order. For example, zigzag-scanning order is also suitable for use in the present invention. It should be also noted that the type of scanning order determines which neighboring blocks have available motion estimation results for predicting the search window of the current block.

In the embodiment shown in FIG. 3, when performing motion estimation for the block 302, a block 312 in the reference frame 310 corresponding to the position of the block 302 in the current frame 300 is loaded into an internal memory and compared with the block 302 to determine the SAD value thereof. If the SAD value is smaller than a predetermined threshold value $\alpha_n$, the process of motion estimation for the block 302 can be ended (with a motion vector (0,0)), and then the process proceeds for the next block. In this manner, the memory bandwidth can also be reduced to approximately 11% for static image transmissions.

If the SAD value between the block 302 and the block 312 is larger than the predetermined threshold value $\alpha_n$, then a predicted search window corresponding to the block 302 is loaded for the following comparison. The range of the predicted search window can be determined based on the related information of the neighboring blocks and spatial correlation between the neighborhood blocks. In this embodiment, the motion vector of the current block can be predicted by using motion vectors of an upper-left neighbor block 1, an upper neighbor block 2, an upper-right neighbor block 3, and a left neighbor block 4. At first, the coordinate of center of the current block is set as (0, 0), such that the coordinates of centers of the upper-left neighbor block 1, the upper neighbor block 2, the upper-right neighbor block 3, and the left neighbor block 4 can be expressed as (−16, 16), (0, 16), (16, 16), (−16, 0). Next, for predicting the motion vector of the current block, a regression plane, z=c−ax−by, can be established by using the motion vectors and the coordinates of the upper-left neighbor block 1, the upper neighbor block 2, the upper-right neighbor block 3, and the left neighbor block 4 according to minimum square method. After substituting the coordinates and the motion vectors of the four neighboring blocks into the equation of the regression plane, the following equation can be obtained:

$$E = \sum_{i=1}^{4} ((c - ax_i - by_i) - MV_i)^2$$

Then, taking partial derivatives with respect to a, b, and c:

$$\partial E/\partial a = 0;$$

$$\partial E/\partial b = 0;$$

$$\partial E/\partial c = 0;$$

By solving the above three equations, the values of a, b, and c can be obtained as followings:

$$a = \tfrac{1}{32}(MV_1 - MV_3);$$

$$b = \tfrac{1}{96}(-5MV_1 - 2MV_2 + MV_3 + 6MV_4);$$

$$c = \tfrac{1}{2}(-MV_1 + MV_3 + 2MV_4);$$

By substituting the values of a, b, and c and the coordinate (0, 0) of the current block into this equation, the predicted motion vector of the current vector is obtained as:

$$MV = \tfrac{1}{2}(-MV_1 + MV_3 + 2MV_4)$$

The range of search window can be predicted according to the predicted motion vector of the current block and the corresponding square pattern, and therefore the present invention can only load the required data, instead of loading whole search range as in conventional motion estimation method. After loading the adaptively adjusted search window, comparison is performed within the loaded search window by using square search algorithm. To sum up, according to one embodiment of the present invention, only the data of the reference frame corresponding to the position of the target block in the current frame need to be loaded for comparison in the beginning. After comparison, the amount of data required to be loaded into the internal memory is determined based on the comparison result, i.e., the size of the search window 320 can be adaptively adjusted. Therefore, the method of the present invention can reduce the amount of data necessary to be transmitted into the internal memory, which can not only decrease the transmission time and power consumption, but also lower the size requirement of the internal memory and the hardware cost.

Except for the data prediction, the present invention also adopts the data reuse scheme in memory management, which can lower the frequency of the memory access and data transfer by storing the reusable data in the internal memory. In other words, after evaluating the reusability of data, an internal memory can be added for avoiding repeatedly accessing the same data, which is capable of effectively reducing the requirements of memory bandwidth. More information regarding the data reuse scheme can be found in the following articles: "Architecture Design for H.264/AVC Integer Motion Estimation with Minimum Memory Bandwidth," by D. X. Li et al., IEEE Trans. Consumer Electron., vol. 53, no. 3, pp. 1053-1060, August 2007; "On the data reuse and memory bandwidth analysis for full-search block-matching VLSI architecture," by J. C. Tuan et al., IEEE Trans. Circuits Syst. Video Technol., vol. 12, no. 1, pp. 61-72, January 2002; "Level C+data reuse scheme for motion estimation with corresponding coding orders," by C. Y. Chen et al., IEEE Trans. Circuits Syst. Video Technol., vol. 16, no. 4, pp. 553-558, April 2006; and "Single Reference Frame Multiple Current Macroblocks Scheme for Multiple Reference Frame Motion Estimation in H.264/AVC," by T. C. Chen et al., IEEE Trans.

Circuits Syst. Video Technol., vol. 17, no. 2, pp. 242-247, February 2007, the entire contents of which being incorporated herein by reference.

The performance of the data reuse scheme can be evaluated by two factors: the size of the internal memory and the redundancy access factor Ra. The size of the internal memory can be used to represent the memory size required for buffering the data of reference blocks for data reuse, and the redundancy access factor Ra can be used for estimating the bandwidth of the external memory and expressed as:

$$Ra = \frac{\text{Total memory bandwidth for reference frame}}{\text{Minimum memory bandwidth (pixel count in total)}}$$

The lower the level of the data reuse is, the higher the Ra is, and also the higher the bandwidth requirement of the memory is. On the contrary, a stronger data reuse level has a smaller Ra and requires lower bandwidth requirement of the memory. The total memory bandwidth can be expressed as:

$$BW = f \times W \times H \times Ra_{current\text{-}frame} + f \times W \times H \times Ra_{reference\text{-}frame}$$

where f is frame rate, W is width of the frame, and H is height of the frame.

Typically, the memory bandwidth depends on the frame rate, frame size, size of the search window, and Ra value, and the frame rate and the frame size are usually fixed for a specific video compression application. Therefore, the present invention utilizes the data reuse scheme with smaller Ra along with the data prediction manner to reduce the size of search window, and further to effectively lower the memory bandwidth.

With reference to the current frame (such as frame 100 in FIG. 1), each block is accessed $SR_H \times SR_V$ times on average, then Ra can be expressed as:

$$Ra = \frac{W \times H \times SR_H \times SR_V}{W \times H} = SR_H \times SR_V$$

Nevertheless, Ra of the current frame can be reduced to 1 by adding a N×N internal memory, which is:

$$Ra = \frac{(W/N) \times (H/N) \times N \times N}{W \times H} = 1$$

Figure 6:
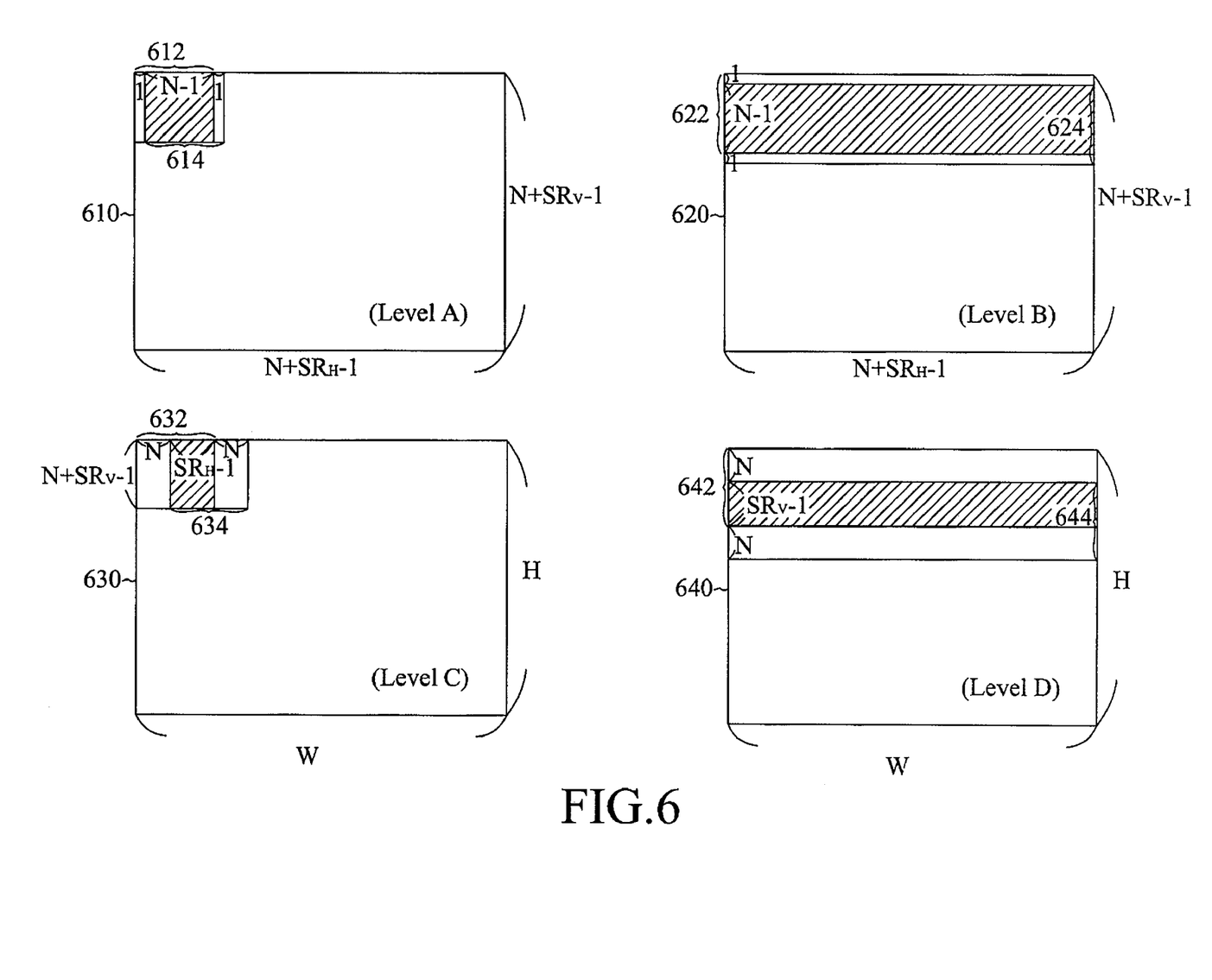
FIG. 6 shows level A to level D of data reuse schemes for the reference frame.

With reference to the reference frame, FIG. 6 shows level A to level D of data reuse schemes in a reference frame, wherein the data in the shaded area can be reused without being accessed from the external memory again. Level A and level B each describes data reuse within single search windows 610 and 620 respectively, while level C and level D involve data reuse among different search windows. In detail, concerning a block of N×N pixels in the current frame, level A can reuse the overlapped pixels of two sequential candidate blocks 612 and 614 in horizontal direction within a signal search window 610 of $(N+SR_H-1) \times (N+SR_V-1)$ pixels in the reference frame, and level B can reuse the overlapped pixels of two sequential candidate block strips 622 and 624 in vertical direction within the search window 620. Level C can reuse the overlapped pixels of two search windows 632 and 634, which are respectively corresponding to two sequential current blocks in horizontal direction, within the reference frame 630, and level D can reuse the overlapped pixels of search windows 642 and 644, which are respectively corresponding to two sequential strips of current blocks in vertical direction, within the reference frame 640. As described above, the total memory bandwidth is decided by Ra, and Ra for level A to level D can be calculated as follows:

Level A:
$$Ra = \frac{W/N \times H/N \times SR_V \times N \times (N + SR_H - 1)}{W \times H} = SR_V \times \left(1 + \frac{SR_H}{N}\right)$$

Level B:
$$Ra = \frac{W/N \times H/N \times SR_V \times N \times (N + SR_H - 1)}{W \times H} = SR_V \times \left(1 + \frac{SR_H}{N}\right)$$

Level C:
$$Ra = \frac{W/N \times H/N \times SR_V \times N \times (N + SR_H - 1)}{W \times H} = SR_V \times \left(1 + \frac{SR_H}{N}\right)$$

Level D:
$$Ra = \frac{W \times H}{W \times H} = 1$$

On the other hand, as shown in FIG. 6, the required sizes of the internal memory for level A to level D schemes are listed in the following table:

| Reuse Level | Internal Memory Size |
|---|---|
| A | N × (N − 1) |
| B | (N + $SR_H$ − 1) × (N − 1) |
| C | ($SR_H$ − 1) × ($SR_V$ + N − 1) |
| D | W × ($SR_V$ − 1) |

Accordingly, there is a trade-off between internal memory size and the memory bandwidth requirement. For example, level A has smallest size of the internal memory size but highest bandwidth requirement, while level D has smallest memory bandwidth but requires huge internal memory.

Level C data reuse scheme can provide better balance between size of the internal memory and bandwidth of the external memory. However, with the steady increase in video resolution, the Level C data reuse scheme has been unable to meet the ever-growing requirements of today's applications. Therefore, the present invention provides a method to combine the function of data reuse and the function of data prediction. In the level C scheme, the present invention can predict and adaptively adjust the size of the search window corresponding to the current block based on the sizes of the search windows corresponding to the neighboring blocks. Further, instead of loading the overlapped region between two whole search windows corresponding to two horizontally adjacent blocks as the conventional Level C did, the present invention can only load the predicted search windows. Therefore, the present invention cannot only effectively reduce the internal memory size but also can lower the memory bandwidth required by level C scheme.

Figure 7:
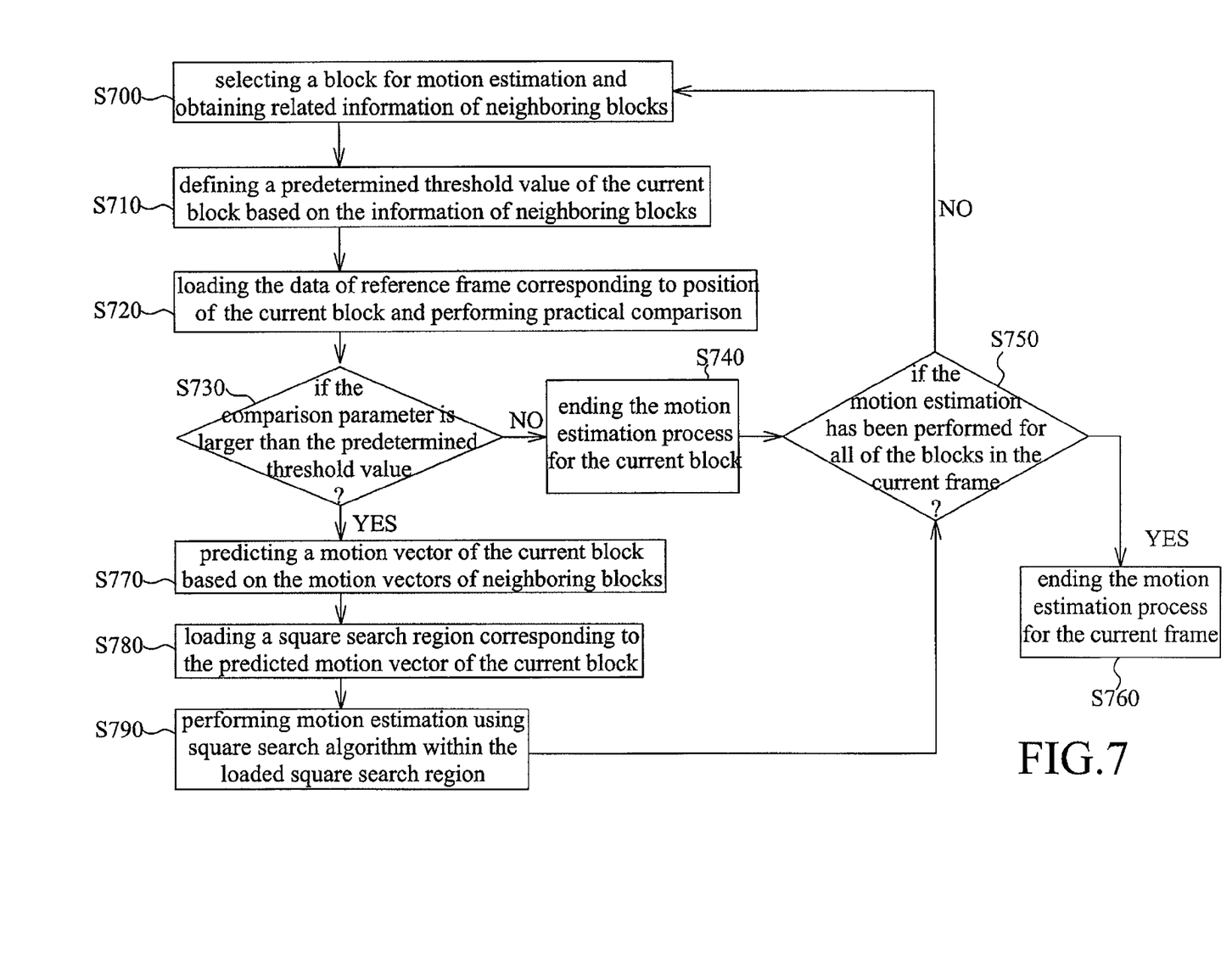
FIG. 7 is a flowchart showing a method for performing motion estimation in accordance with one embodiment of the present invention.

FIG. 7 is a flowchart showing a method for performing motion estimation in accordance with one embodiment of the present invention. Typically, before performing block-matching motion estimation, the current frame is divided into a plurality of blocks and the block scanning order for performing the motion estimation is chosen. In this embodiment, the block scanning order of motion estimation is raster-scanning order, and for each specific block, the motion estimation is performed by using square search algorithm. First, in step S700, a block is selected for motion estimation, and motion information (such as adaptive search windows, predicted motion vectors, and residual data) of some of its neighboring blocks which have already been processed by motion estimation are obtained. Next, in step S710, a predetermined threshold value $\alpha_n$ corresponding to the current block is determined based on the residual data of the neighboring blocks. For example, the predetermined threshold value $\alpha_n$ can be set as a weighted sum of the residual data of the neighboring blocks. It should be noted that the predetermined threshold value $\alpha_n$ could be adjusted according to different requirements in practical applications. Next, in step S720, the data of one reference block in the reference frame corresponding to position of the current block are loaded and practically compared with the current block to calculate the SAD value thereof.

Next, in step S730, the predetermined threshold value $\alpha_n$ determined in step S710 is compared with the SAD value calculated in step S720. If the SAD value is smaller than the predetermined threshold value $\alpha_n$, the procedure proceeds to step S740 to terminate the motion estimation for this current block and further proceeds to step S750 to determine whether the motion estimation has been performed for all of the blocks in the current frame. If it does, the procedure ends at step S760. Otherwise, the procedure returns to step S700 to perform motion estimation for next block.

In step S730, if the SAD value is larger than the predetermined threshold value $\alpha_n$, the procedure proceeds to step S770 to predict the motion vector of the current block according to the motion vectors of the neighboring blocks. In this embodiment, the prediction equation can be obtained by using minimum square method to solve a regression plane based on the motion vectors and the coordinates of the upper-left neighboring block, the upper neighboring block, the upper-right neighboring block, and the left neighboring block. It should be noted that the above equation for predicting search window could be modified to accommodate changes in block scanning order. Next, in step S780, the square search region corresponding to the predicted motion vector of the current block is loaded from the external memory into the internal memory. Next, in step S790, the motion estimation is performed for the selected block using the square search algorithm to find a best-match block within the loaded search region. If the best-match block is found in step S790, the procedure goes back to step S750 and repeats the above-mentioned steps until the motion estimation for the current frame is completed. It should be noted that if the square search algorithm is unable to determine the best-match block in step S790, other various alternative approaches can also be considered to determine a corresponding matching block, such as defining a block having minimum SAD value in the predicted search window as the best-match block, or reloading other or larger range of search window for a new comparison.

The present invention can effectively reduce the memory bandwidth and the size of the internal memory by utilizing residual data of the neighbor blocks and result of the first practical comparison, and can predict the range of the search window corresponding to the current block based on the motion vectors of the neighbor blocks. Instead of loading the whole search windows corresponding to two horizontally adjacent blocks as in the conventional Level C data reuse scheme, only the predicted search window is required to be loaded in the present invention. Therefore, according to different embodiments of the present invention, the usage of the internal memory can be reduced to 30%-60% and bandwidth requirements can also be reduced to approximately 40%-80%. The motion estimation method combining the data prediction function and the data reuse function provided by the present invention can be applied to the software/hardware memory management of various real-time embedded multimedia systems.

While this invention has been described with reference to the illustrative embodiments, these descriptions should not be construed in a limiting sense. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

We claim:

1. A method for performing motion estimation, comprising:
   (a) selecting a current block in a current frame;
   (b) obtaining motion vectors and residual data of a plurality of neighboring blocks adjacent to the current block;
   (c) setting a predetermined threshold value according to the residual data of the plurality of neighboring blocks;
   (d) comparing the current block with an initial reference block in a reference frame to obtain an initial comparison result, and comparing the predetermined threshold value with the initial comparison result;
   (e) determining a predicted motion vector of the current block according to the motion vectors of the plurality of neighboring blocks if the initial comparison result is larger than the predetermined threshold value;
   (f) performing a block-matching operation in a search window corresponding to the predicted motion vector to determine a best-match reference block in the search window;
   wherein the predetermined threshold value is represented as:
   $\alpha n = (2 \times \text{LEFTSAD} + 2 \times \text{TOPSAD} + \text{TOP-RIGHTSAD} + \text{TOP-LEFTSAD} + \epsilon)/6$;
   where LEFTSAD is residual data of a left neighboring block of the current block, TOPSAD is residual data of an upper neighboring block of the current block. TOP-RIGHTSAD is residual data of an upper-right neighboring block of the current block, TOP-LEFTSAD is residual data of an upper-left neighboring block of the current block, and $\epsilon$ is a constant factor.

2. The method according to claim 1, wherein position of the initial reference block in the reference frame is corresponding to position of the current block in the current frame.

3. The method according to claim 1, wherein the step (f) is performed by using a square search algorithm.

4. The method according to claim 1, wherein in the step (d), if the initial comparison result is smaller than the predetermined threshold value, the initial reference block is determined as the best-match reference block.

5. The method according to claim 4, further comprising a step of repeating the step (a) to the step (f), wherein in the step (a), the current block is selected in a raster-scan order.

6. The method according to claim 1, wherein the initial comparison result is a function of a SAD (sum of absolute difference) value between the current block and the initial reference block.

7. The method according to claim 1, further comprising the following steps:
   (g) loading the search window from an external memory into an internal memory;
   (h) determining a search window corresponding to a next block adjacent to the selected current block;
   (i) comparing the search window determined in the step (h) and the search window loaded in the step (g) to determine an added search window, and loading the added search window from the external memory into the internal memory.

8. A non-transitory computer readable medium embedded with a computer executable program including instructions for causing a computing device to implement the method of claim 1.

9. A method for performing motion estimation, comprising:
(a) selecting a current block in a current frame;
(b) obtaining motion vectors and residual data of a plurality of neighboring blocks adjacent to the current block;
(c) setting a predetermined threshold value according to the residual data of the plurality of neighboring blocks;
(d) comparing the current block with an initial reference block in a reference frame to obtain an initial comparison result, and comparing the predetermined threshold value with the initial comparison result;
(e) determining a predicted motion vector of the current block according to the motion vectors of the plurality of neighboring blocks if the initial comparison result is larger than the predetermined threshold value;
(f) performing a block-matching operation in a search window corresponding to the predicted motion vector to determine a best-match reference block in the search window; and
wherein the predicted motion vector of the current block is represented as:

$$MV = \frac{1}{2}(-MV1 + MV3 + 2MV4);$$

where MV1 is a motion vector of an upper-left neighboring block of the current block, MV3 is a motion vector of an upper-right neighboring block of the current block, and MV4 is a motion vector of a left neighboring block of the current block.

10. The method according to claim 9, wherein position of the initial reference block in the reference frame is corresponding to position of the current block in the current frame.

11. The method according to claim 9, wherein the step (f) is performed by using a square search algorithm.

12. The method according to claim 9, wherein in the step (d), if the initial comparison result is smaller than the predetermined threshold value, the initial reference block is determined as the best-match reference block.

13. The method according to claim 12, further comprising a step of repeating the step (a) to the step (f), wherein in the step (a), the current block is selected in a raster-scan order.

14. The method according to claim 9, wherein the initial comparison result is a function of a SAD (sum of absolute difference) value between the current block and the initial reference block.

15. The method according to claim 9, further comprising the following steps:
(g) loading the search window from an external memory into an internal memory;
(h) determining a search window corresponding to a next block adjacent to the selected current block;
(i) comparing the search window determined in the step (h) and the search window loaded in the step (g) to determine an added search window, and loading the added search window from the external memory into the internal memory.

* * * * *